(12) United States Patent
Frank et al.

(10) Patent No.: US 7,075,208 B2
(45) Date of Patent: Jul. 11, 2006

(54) MACHINE WITH A COOLABLE WINDING ARRANGED IN A WINDING SUPPORT AND WITH A TORQUE TRANSMITTING DEVICE

(75) Inventors: Michael Frank, Uttenreuth (DE); Adolf Kühn, Röthenbach (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/522,952

(22) PCT Filed: Jul. 21, 2003

(86) PCT No.: PCT/DE03/02446

§ 371 (c)(1),
(2), (4) Date: Feb. 2, 2005

(87) PCT Pub. No.: WO2004/017503

PCT Pub. Date: Feb. 26, 2004

(65) Prior Publication Data

US 2006/0082249 A1    Apr. 20, 2006

(30) Foreign Application Priority Data

Aug. 2, 2002    (DE) .................................. 102 35 503

(51) Int. Cl.
*H02K 3/46* (2006.01)
(52) U.S. Cl. .................. 310/270; 310/261; 310/52
(58) Field of Classification Search .................. 310/52, 310/91, 179, 264–265, 270
See application file for complete search history.

(56) References Cited

U.S. PATENT DOCUMENTS

| 4,117,357 A | * | 9/1978 | Baumann ...................... 310/52 |
| 4,123,676 A | * | 10/1978 | Cooper et al. ................. 310/52 |
| 4,239,999 A | | 12/1980 | Vinokurov et al. |
| 4,319,149 A | * | 3/1982 | Eckels .......................... 310/52 |
| RE33,186 E | * | 3/1990 | Mori et al. .................. 148/409 |
| 5,880,547 A | | 3/1999 | Shoykhet |
| 6,129,477 A | | 10/2000 | Shoykhet |
| 6,657,333 B1 | * | 12/2003 | Shoykhet et al. ............. 310/61 |

(Continued)

FOREIGN PATENT DOCUMENTS

| DE | 27 53 461 A1 | 6/1978 |
| GB | 2 051 303 A | 1/1981 |
| WO | WO98/02953 | 1/1998 |

OTHER PUBLICATIONS

Bogner et al., "Electrical Machines with Superconductors, Part 3, Turbogenerators", Siemens Forsch.-und Entwickl.-Ber., vol. 5, 1976, No. 1, pp. 10-16.

(Continued)

*Primary Examiner*—Thanh Lam
(74) *Attorney, Agent, or Firm*—Staas & Halsey LLP

(57) ABSTRACT

The machine comprises a rotor with a winding for cooling, which is in particular superconducting, in a winding support. A device with a composite body made of fiber-reinforced plastic is provided, for retention of the winding support within a rotor outer housing, on a torque transmitting side. The composite body is in one piece and comprises lateral pieces and a center piece, whereby the lateral pieces extend outwards in a funnel shape and the center piece is in the form of a hollow cylinder. The lateral pieces should at least partly comprises a corrugated form in the circumferential direction and are connected with a positive or friction fit by press-ring bodies with flange-like fixing pieces made from metal.

16 Claims, 5 Drawing Sheets

U.S. PATENT DOCUMENTS

| | | | |
|---|---|---|---|
| 6,815,856 B1 * | 11/2004 | Maguire et al. | 310/92 |
| 6,836,043 B1 * | 12/2004 | Boss et al. | 310/91 |
| 2004/0051419 A1 * | 3/2004 | Frank et al. | 310/270 |
| 2004/0245865 A1 * | 12/2004 | Ries | 310/52 |

OTHER PUBLICATIONS

Seeber, Handbook of Applied Superconductivity, vol. 2, Applications, 1998, pp. 1497-1499 and 1522-1530.

* cited by examiner

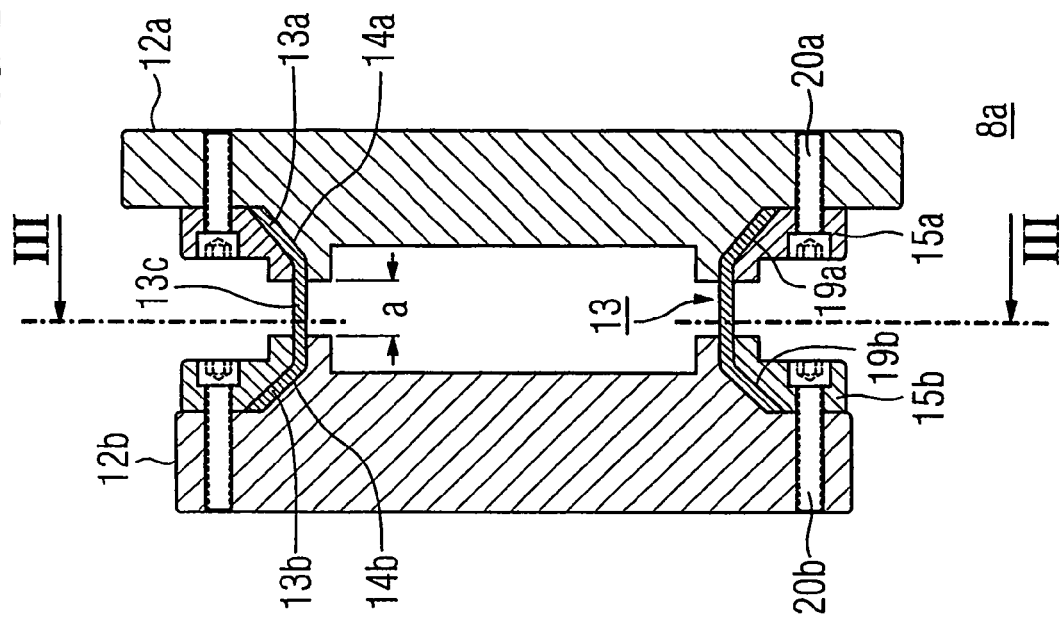
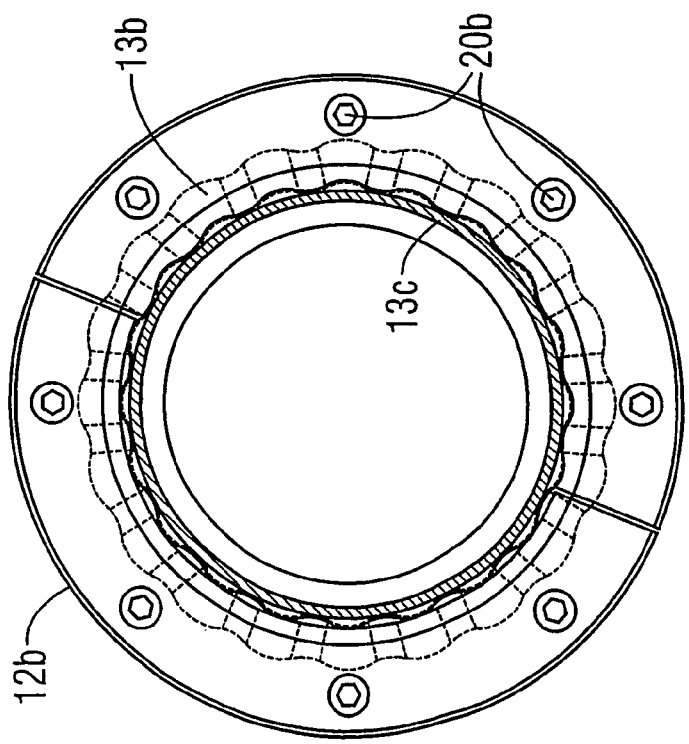

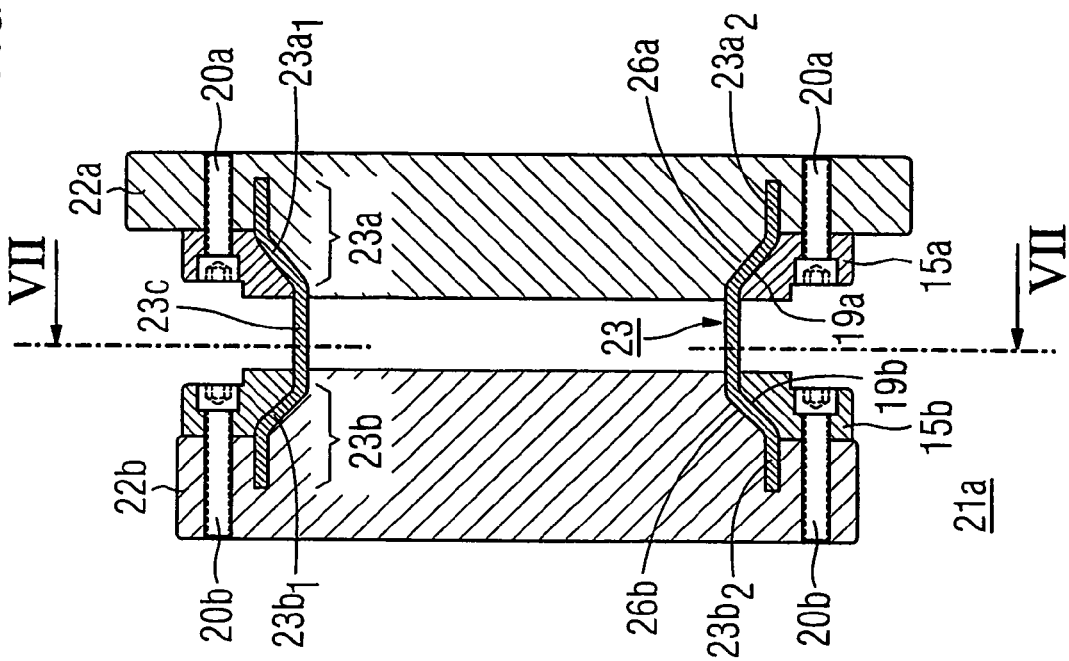
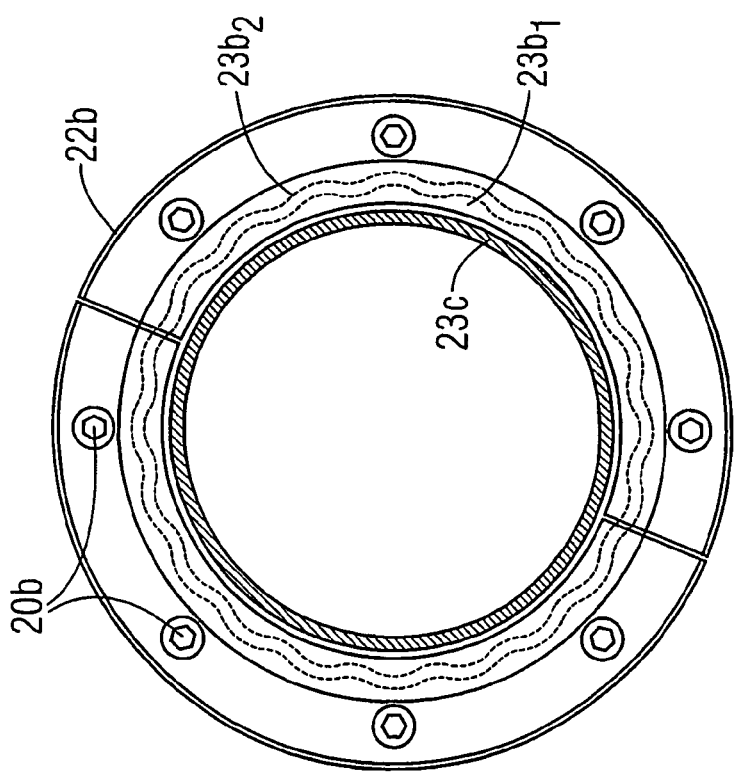

MACHINE WITH A COOLABLE WINDING ARRANGED IN A WINDING SUPPORT AND WITH A TORQUE TRANSMITTING DEVICE

CROSS REFERENCE TO RELATED APPLICATIONS

This application is based on and hereby claims priority to PCT Application No. PCT/DE2003/002446 filed Jul. 21, 2003 and German Application No. 102 35 503.7 filed Aug. 2, 2002, the contents of which are hereby incorporated by reference.

BACKGROUND OF THE INVENTION

The invention relates to a machine having a rotor which is mounted such that it can rotate about a rotation axis and has a rotor external housing which is attached to rotor shaft parts and surrounds a winding former with a winding that is to be cooled, in particular a superconductive winding. The rotor also has a device to hold the winding former within the rotor external housing, which device comprises, at least at one end of the winding former, a device which transmits torque between the winding former and the associated rotor shaft part with at least one rotationally symmetrical composite body composed of a plastic reinforced with fiber material. A corresponding machine is disclosed in U.S. Pat. No. 5,880,547 A.

Special types of electrical machines, in particular generators or motors, have a rotating field winding and a stationary stator winding. In this case, the current density and thus the specific power of the machine, that is to say the power per kilogram of its own weight; can be increased, and the efficiency of the machine can also be increased, by the use of cryogenically cooled and in particular superconductive conductors.

Cryogenically cooled windings of electrical machines generally have to be thermally isolated from the environment and have to be kept at the required low temperature by a coolant. Effective thermal isolation can in this case be achieved only by the cryogenically cooled parts of the machine being separated as far as possible from the warm external area by a vacuum with a residual gas pressure of generally less than $10^{-3}$ mbar, and by the connecting parts between these cryogenically cooled parts and the warm external area transmitting as little heat as possible. Two variants, in particular, are known for vacuum isolation of rotors with rotor windings which have to be cryogenically cooled and with warm stator windings:

In a first embodiment, the rotor has a warm external housing and an encapsulated vacuum area which rotates with the rotor. The vacuum area should in this case surround the cryogenically cooled area on all sides (see, for example, "Siemens Forsch. u. Entwickl.-Ber. [Siemens Research and Development Reports]", Vol. 5, 1976, No. 1, pages 10 to 16). However, heat is transferred undesirably to the cryogenically cooled parts via the supports which extend through the vacuum area.

In a second embodiment, the essentially cold rotor rotates in a hard vacuum. In this case, the outer boundary of the hard vacuum area is defined by the internal bore of the stator. However, an arrangement such as this requires shaft seals which can resist a hard vacuum between the rotor and the stator (see, for example, DE 27 53 461 A).

The first-mentioned variant is provided in the machine which can be found in the cited US-A specification. Accordingly, a superconductive winding for its rotor is located in the interior of a rotor cryostat which, together with flanged shafts that are fitted, forms an external housing for the rotor. Helium cooling is provided for the winding superconductors. In contrast, the external contour of the rotor external housing is approximately at room temperature, or even above room temperature during operation. The useful torque from the machine is produced in the rotor winding. This rotor winding is arranged in a cold winding former which is itself suspended and held in an isolated form in the rotor external housing, which acts as a cryostat. In this case, this suspension or retention on the drive end of the rotor, which is frequently also referred to as the A side of the machine, must be sufficiently robust to transmit the torque from the cold winding former to a warmer shaft part on the drive end. A corresponding, rigid connecting device for torque transmission therefore has to be designed to be relatively massive and must be connected to the winding former and to the shaft part on the drive end such that power can be transmitted. This means that heat is unavoidably introduced into the cold area of the rotor. It is therefore frequently necessary to cool the connecting device which transmits the torque (see, for example, "Handbook of Applied Superconductivity", Vol. 2: Ed.: B. Seeber, Institute of Physics Publishing, Bristol (GB), 1998, pages 1497 to 1499 and 1522 to 1530). At the same time, this connecting device also provides the drive-side centering for the cold winding former. Virtually no torque is emitted on the opposite rotor side, which is also referred to as the non-drive end or in general as the B side, where important connections, such as a coolant supply, are provided for operation of the machine. Only the functions of centering and thermal isolation therefore, essentially, have to be carried out here. Furthermore, measures to compensate for shrinkage of the cooled winding former are planned there.

In order to reduce the amount of heat which is introduced into the cooled superconductive area of the rotor, one specific embodiment of the machine that is disclosed in the cited US-A specification provides for the connecting device which transmits the torque to have, at least on the drive end, a hollow-cylindrical composite body composed of a glass-fiber-reinforced plastic. This hollow cylinder is provided at each of its two axle ends with a steel attachment part, which is connected to the winding former and to the drive shaft such that power can be transmitted. The mechanical connection between the plastic hollow cylinder and the steel attachment parts has to ensure good resistance to overloads and a long fatigue life when subjected to alternating loads, since, for example during starting and in various fault situations on motors such as these, considerably higher torques than those during normal operation occur and must not lead to damage to the device which transmits the torque. However, the US-A specification does not contain any details relating to this.

Such details are addressed in U.S. Pat. No. 6,129,477 A. In this case, a conically running surface is used to transmit torque between the various parts of this device, which are composed of materials with different shearing moduli via a connecting device, with the intention of bonding occurring between these parts on this surface. A first part of the connecting device is in this case composed of a glass-fiber-reinforced plastic, while a second part is made of metal. In this case as well, the functionality of the torque transmission depends to a major extent on the fatigue life of the bond between these parts.

In addition to metallic superconductor materials such as NbTi or $Nb_3Sn$ which have been known for a long time and as are used in the machines mentioned above, metal-oxide superconductor materials with critical temperatures above 77 K have also been known since 1987. Attempts have been made to use conductors based on such high-$T_c$ superconductor materials, which are also referred to as HTC materials, to produce superconductive windings for machines (see, for example, WO 98/02953 A). Owing to the temperature differences between the operating temperature of the superconductor material and the external temperature on the warmer rotor external housing, even machines of this conductor type require measures to reduce the temperature that is introduced into the superconductive area.

SUMMARY OF THE INVENTION

One potential object is to refine the machine having the features mentioned initially such that its connecting device for torque transmission makes it possible to provide a connection which can transmit power and ensures a long fatigue life and good resistance to overloading between the cold winding former and the associated warm rotor shaft part, while at the same time limiting the losses resulting from heat being introduced into the cold winding former.

Accordingly, in the case of the machine having the features quoted in the introduction, the composite body of the device which transmits torque should integrally contain side parts and a center part located between them, with the side part being formed at least in one subsection such that it widens towards the exterior in the form of a funnel, and with a center part being formed as a hollow cylinder, and with the side parts, at least in one subsection having a corrugated shape when seen in the circumferential direction, while the center part is at least largely uncorrugated. In this case, the composite body should be connected on its side parts to flange-like attachment points composed of metal, in that at least each side part of the composite body can be pressed against a mating surface whose shape is matched to it, by a compression ring body, which can be connected to the respective attachment part in a force-fitting manner and has a pressing surface whose shape is matched to it, with at least a section of the center part of the composite body being left free.

The advantages associated with this refinement of the machine are that the particular refinement of the rotationally symmetrical fiber composite body at least in the area of its end side parts, and the corresponding design of the flange-like attachment parts in the connecting area to these side parts results in a good interlocking connection, which can transmit power, between the poorly thermally conductive part of the composite body and the metal parts of the winding former. This advantageously avoids problems relating to the shear strength, in particular with respect to overload and during continuous operation, in the connecting area between the plastic and metal, and which otherwise represents a weak point for torque transmission, in that the torque is now transmitted primarily by pressure or a pressing force and less by shear, by matched corrugation to the parts which rest on one another in an interlocking manner.

If required, the power transmission can be improved by coating, in particular, the corrugated surfaces of the fiber composite body with a suitable adhesive resin, which may be filled or unfilled, before installation in order to prevent cavities from appearing during the pressing process. Such pressing and the matched corrugation do not just prevent the fiber composite body from sliding with respect to the attachment parts; in fact, this also improves the power transmission by compression forces instead of by shear forces in the "metal-plastic" connecting area.

Thus, in particular, the side parts are provided with a corrugated shape which is distributed uniformly over the circumference. In this case, the corrugated shape may preferably be sinusoidal or in the form of a circular arc. A refinement of the side parts such as this and of those surfaces of the compression ring body and of the attachment elements which rest on them in an interlocking manner makes it possible to ensure that power is transmitted particularly uniformly between these parts. The corrugation of the side parts in this case may be implemented only in one subsection in each case.

It can be regarded as being particularly advantageous for the center part of the fiber composite body to be pressed against a corresponding part of the respective mating surface in an interlocking manner such that power can be transmitted in the side junction areas to the respective side part from the respective compression ring body. This avoids particular loading in the junction areas between the corrugated side parts and the uncorrugated center part. The uncorrugated configuration of the remaining center part in this case advantageously assists in the reduction of the risk of this part buckling.

Furthermore, it is particularly advantageous for at least the majority (that is to say more than half) of the fibers of the fiber material to extend without interruption at least over the junction area between the center part of the composite body and the respective side part. This is because fibers which are continuous over these areas contribute to these intrinsically critical areas having a high power loading capability. Known fiber materials, in particular glass fibers or carbon fibers, may be used as the fibers.

In order to improve the power transmission and to achieve good torque transmission between the flange-like attachment elements and the winding former or the drive-side housing or rotor shaft part, the attachment elements are advantageously provided with an end tooth system, which engages in a corresponding tooth system on the respective mating piece. The tooth system may in this case be designed to be self-locking. Appropriate tooth systems are known per se.

Either metallic low-$T_c$ superconductor material or, in particular, metal-oxide high-$T_c$ superconductor material may be used for the conductors for the winding to be cooled. The use of the last-mentioned material simplifies the cooling technique.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a longitudinal section through a first specific refinement of a connecting device which transmits torque for this machine, FIG. 3 shows a plan view of a cross section through this connecting device as shown in FIG. 2.

DETAILED DESCRIPTION OF THE PREFERRED EMBODIMENT

Figure 1:
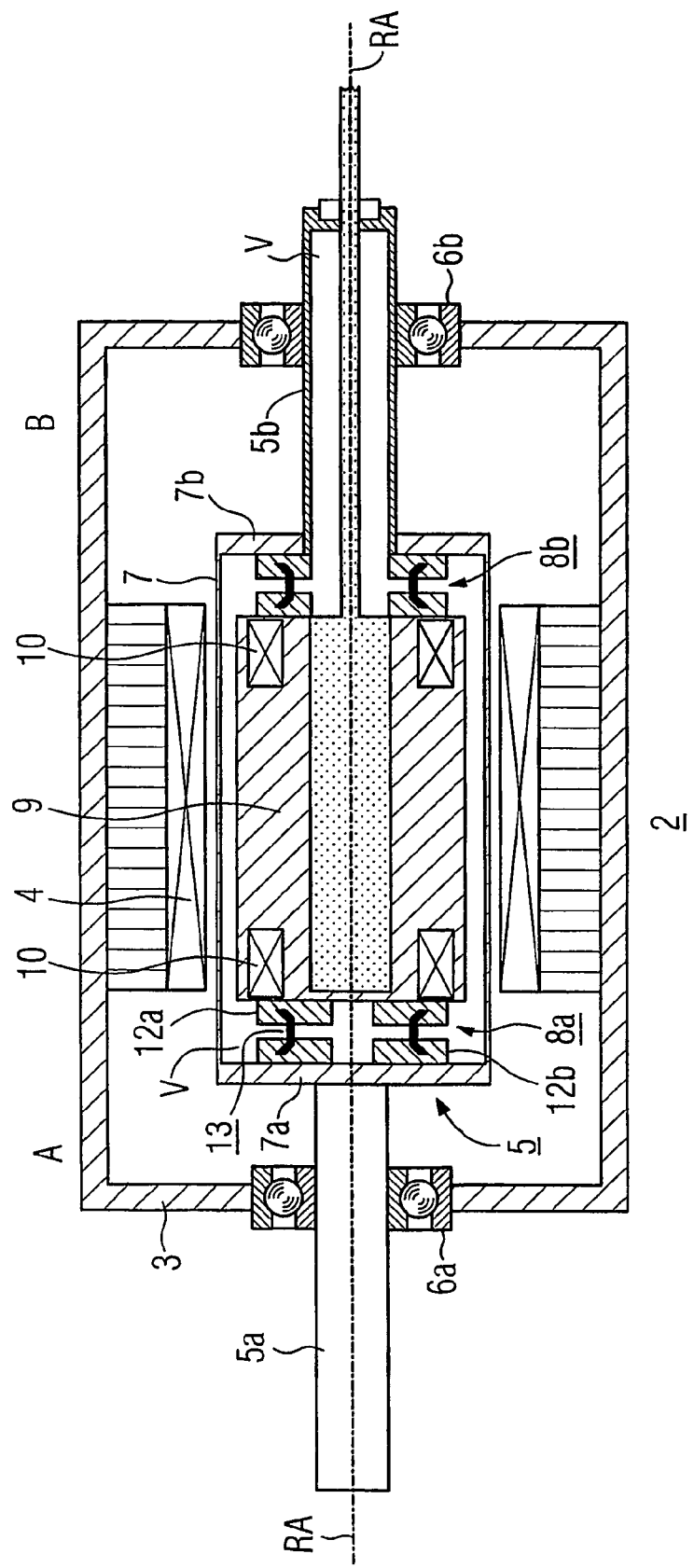
FIG. 1 shows a longitudinal section through one possible embodiment of the machine.
Figure 4:
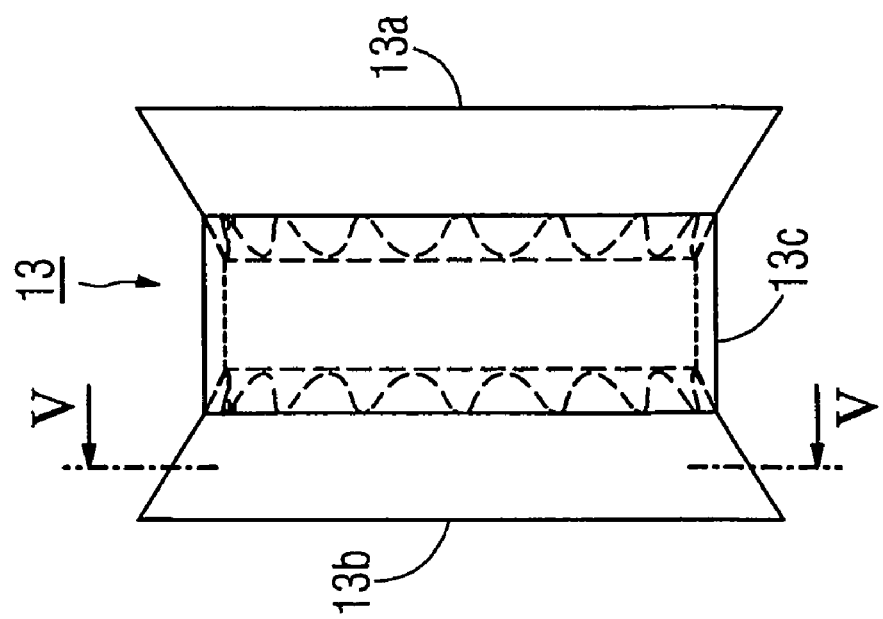
FIG. 4 shows a longitudinal section through the fiber composite body of this connecting device.
Figure 5:
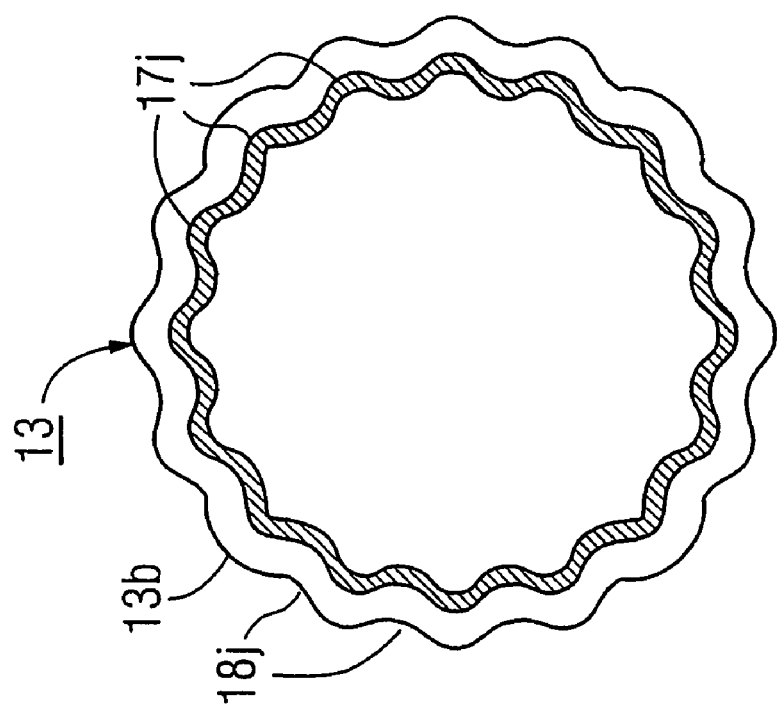
FIG. 5 shows a cross section through this fiber composite body in the area of a side part, FIGS. 6 and 7 respectively show a longitudinal section and a cross section through a further embodiment of a connecting device which transmits torque, corresponding to the illustration in FIGS. 2 and 3.

Reference will now be made in detail to the preferred embodiments of the present invention, examples of which are illustrated in the accompanying drawings, wherein like reference numerals refer to like elements throughout.

Corresponding parts are provided with the same reference symbols in the figures.

The embodiment of the machine as described in the following text may, in particular, be a synchronous motor or a generator. Other fields of application or use of corresponding machines, for example for high rotation speeds, compact drives, for example for marine vessels or for so-called off-shore facilities such as drilling platforms are, of course, also possible. The machine has a rotating, normally conductive or superconductive rotor winding, which in principle allows use of metallic low-$T_c$ superconductor material or, in particular, oxide high-$T_c$ superconductor material. The winding may be in the form of a coil or a system of coils based on a two-pole, four-pole or other multiple pole arrangement. The fundamental design of a synchronous machine such as this is shown in FIG. 1, based on known embodiments of machines such as these (see the cited publications).

The machine, which is annotated in general by 2, has a stationary machine external housing 3 which is at room temperature and has a stator winding 4 in it. A rotor 5 is held within this external housing and surrounded by the stator winding 4, in bearings 6a and 6b such that it can rotate about a rotation axis RA. For this purpose, the rotor has a rotor external housing 7 which is in the form of a vacuum vessel and in which a winding former 9 with a winding 10 that is to be cooled, for example an HTC winding, is held. On each of its axially opposite (end) faces, this rotor external housing has a housing part 7a or 7b which is in the form of a disk or annular disk. Each of these housing parts is respectively rigidly connected to an axial rotor shaft part 5a or 5b, with each rotor shaft part being associated with a respective one of the bearings 6a or 6b. A rigid, rotationally symmetrical device 8a is provided on the so-called drive end A of the rotor external housing 7, between the winding former and the housing part 7a, which is in the form of a disk and is firmly connected to the rotor shaft part 5a. In particular, the torque is also transmitted via this device, which is designed and is referred to in the following text as a connecting device 8a, by flange-like attachment parts 12a and 12b at the ends and a fiber composite body 13 which runs inbetween them (see, in particular, FIGS. 2 and 3). This composite body is advantageously essentially in the form of a poorly thermally conductive hollow cylinder composed of a plastic material reinforced with fibers such as glass fibers (so-called "GFC" material). In this case, the fibers are placed in a manner known per se in the plastic material, which is used as a matrix for them and is selected on the basis of strength considerations, preferably over the entire axial extent. The fibers in this case preferably run obliquely with respect to the rotation axis RA in the plastic material, that is to say not parallel or at right angles to it. If required, they may also be in different layers, in which case their angles with respect to the axis may also differ. The composite material formed in this way then ensures sufficiently good mechanical stiffness for torque transmission and a high shear modulus (G modulus) with low thermal conductivity at the same time. Further details of the connecting device which transmits torque are illustrated in particular in FIGS. 2 to 5.

As is also evident from FIG. 1, a further connecting device 8b is arranged between the winding former 9 and the side housing part 7b (which is in the form of a disk) of the rotor external housing 7 at the non-drive end, which is opposite the drive end A and is referred to in the following text as B. Inter alia, a coolant supply for cooling the (in particular) superconductive winding 10 from outside the machine is provided via the hollow-cylindrical shaft part 5b at this end B. Details of the coolant supply and of the seal are known. These parts have therefore not been illustrated in detail in the figure. A vacuum which surrounds the winding former 9 together with the winding 10 to be cooled is annotated V. The vacuum exists, in particular, between the warm rotor external housing 7 and the cold winding former 9. The illustration does not show known measures for thermal isolation, such as superisolation.

GFC parts are advantageously used to reduce the amount of heat introduced from the side housing parts 7a and 7b (which are at room temperature and are thus warmer) of the rotor external housing into the cold part (which is at low temperature) of the winding former 9, and thus into the cold winding 10. The longitudinal section in FIG. 2 shows one specific embodiment of a connecting device 8a designed at the drive end A. The connecting device 8b at the non-drive end B may have corresponding features. Furthermore, the latter device should be designed so as to allow axial expansion compensation owing to shrinkages of the cooled rotor parts.

In addition to the requirement to minimize the heat transmission, it must also, in particular, be possible to transmit high machine torques between the GFC fiber composite body 13 and the metal flange-like attachment parts 12a and 12b. For this purpose, the fiber composite body 13, which is rotationally symmetrical and surrounds the axis RA, is composed of at least three parts, specifically a hollow-cylindrical center part 13c as well as two side parts 13a and 13b which widen axially outwards in the form of a funnel from the radius of the center part to larger radii (in this context, see also FIG. 4). In this case, a single subsection of these side parts could in each case be structured, as a departure from a smooth, uncorrugated funnel shape, so as to result, when seen in the circumferential direction, in a regular corrugation with projections 17j and depressions 18j. The corrugated shape is shown in more detail in the side cross-sectional view in FIG. 3 and, in particular, in the cross section shown in FIG. 5. Such corrugation can preferably be stamped by appropriate shaping tools while the fiber composite body is still in a state in which it can be deformed during production, during which process the fiber reinforcement is advantageously not damaged, so that the mechanical robustness of the composite material is maintained. The fiber composite body 13 together with its center part 13c and its end face parts 13a and 13b are thus formed integrally. The corrugation of the side parts on which the figures are based is preferably sinusoidal and, in particular, is distributed uniformly over the entire circumference, for good torque transmission. If required, however, other corrugation shapes, such as circular arc shapes, may also be provided, and the circumference also need be provided with such corrugation only in individual areas. In contrast, the center part 13c could at least largely be uncorrugated.

In order to ensure an interlock between the side parts 13a and 13b that have been corrugated in this way and the respective attachment part 12a or 12b, the mating surfaces 14a and 14b of the respective attachment parts should have a corrugation matching the corrugation on the associated side parts. A compression ring body 15a and 15b, respectively, is in each case provided in order to ensure that the side parts 13a and 13b are firmly seated on these mating surfaces 14a and 14b, as can also be seen from FIG. 2. These compression ring bodies are likewise corrugated on their respective pressing surfaces 19a and 19b, which rest on the respective side part, with this corrugation being matched to the corrugation on the side of the respective side part facing away from the mating surface. In the exemplary embodiment shown in FIG. 2, the compression bodies 15a and 15b can be screwed to the respective attachment parts 12a and 12b by screw connections 20a and 20b such that the side parts are firmly pressed against the associated mating surfaces such that power can be transmitted. If required, before installation, the fiber composite body 13 may also be coated with a suitable filled or unfilled adhesive resin on the side parts for better power transmission, in order to ensure that no cavities are produced during the pressing process. If the metal surfaces of the attachment parts are treated with a separating mechanism, the structure can also advantageously be disassembled in the event of a defect in the fiber composite body. The machine is now provided with interlocking, power-transmitting compression instead of the previously normal, purely known bonding technique for the connection between the metal and the fiber composite material.

As can also be seen from FIG. 2, the attachment elements 12a and 12b and the compression ring bodies 15a and 15b do not just surround the side parts 13a and 13b of the fiber composite body 13, but also extend somewhat over the center part 13c. The distance a to be kept free in particular between the compression ring bodies 15a and 15b, that is to say without any touching metallic parts, is in this case defined on the one hand with regard to strength aspects and on the other hand with regard to the heat transmission being as low as possible. This makes it possible to prevent particularly powerful loads in the junction area from the corrugated side parts to the uncorrugated center part.

Effective torque transmission between the metallic attachment parts 12a and 12b and the non-metallic fiber composite body 13 can thus be ensured without any risk of damage in the connecting areas between these parts when high torsional forces occur. Furthermore, this at the same time forms a precautionary measure against the possibility of cracks being formed on edges.

Other refinements of the side parts 13a and 13b of the fiber composite body 13 and thus of the associated mating surfaces of the respective attachment element 12a, 12b and of the compression ring bodies 15a, 15b are, of course, also possible, provided that projections and depressions (which engage in one another and are distributed regularly in this direction) on the parts to be connected preclude rotation with respect to one another in the circumferential direction, and ensure the required torque transmission. These requirements can be satisfied in particular by the corrugation illustrated in FIGS. 2 and 3. However, other structures which engage in one another, such as tooth systems, are also feasible. Other structures such as these are also intended to be covered by the expression "corrugation" (or "corrugated") for the refinement of the fiber composite body and of the parts associated with it.

FIGS. 6 and 7 respectively show a longitudinal section and a cross section, illustrated in a form corresponding to FIGS. 2 and 3, of a further exemplary embodiment of a fiber composite body 23 such as this in a connecting device 21a. The device 21a differs from the connecting device 8a shown in FIG. 2 essentially by a particular shape of its fiber composite body 23 between the metal attachment parts 22a and 22b. Like the fiber composite body 13, the fiber composite body 23 has a tubular, uncorrugated center part 23c. However, its side parts 23a and 23b are specially shaped. Specifically, these side parts 23a and 23b are each composed of two respective subsections $23a_1$, $23a_2$ and $23b_1$, $23b_2$, with the subsections $23a_1$ and $23b_1$ which are adjacent to the center part 23c each being in the form of a funnel which widens outwards, and the subsections $23a_2$ and $23b_2$ forming hollow-cylindrical end parts which extend outwards parallel to the axis. At least one of the two subsections of each side part is once again corrugated. A corrugated shape can thus be provided, for example, only for the end parts $23a_2$ and $23b_2$, as assumed for the exemplary embodiment. However, it is also possible, in addition to this or instead of it, to include a corrugated shape for the funnel-shaped subsections $23a_1$ and $23b_1$ as shown in FIG. 2. In order to install the connecting device 21a, corrugated end parts $23a_2$ and $23b_2$ are inserted into correspondingly milled grooves in the respective flange-like attachment part 22a or 22b, with their respective funnel-shaped subsections $23a_1$ and $23b_1$ resting on a respective mating surface 26a or 26b, with a matched shape, on the associated attachment part. The power transmitting connection between these parts is once again provided by compression ring bodies 15a and 15b, whose pressing surfaces 19a and 19b press the fiber composite body 23 against the mating surfaces 26a and 26b of the respective attachment part 22a or 22b. In this embodiment, each compression ring body and the associated mating surfaces may, of course, also extend somewhat over the tubular center part (without corrugation).

Figure 8:
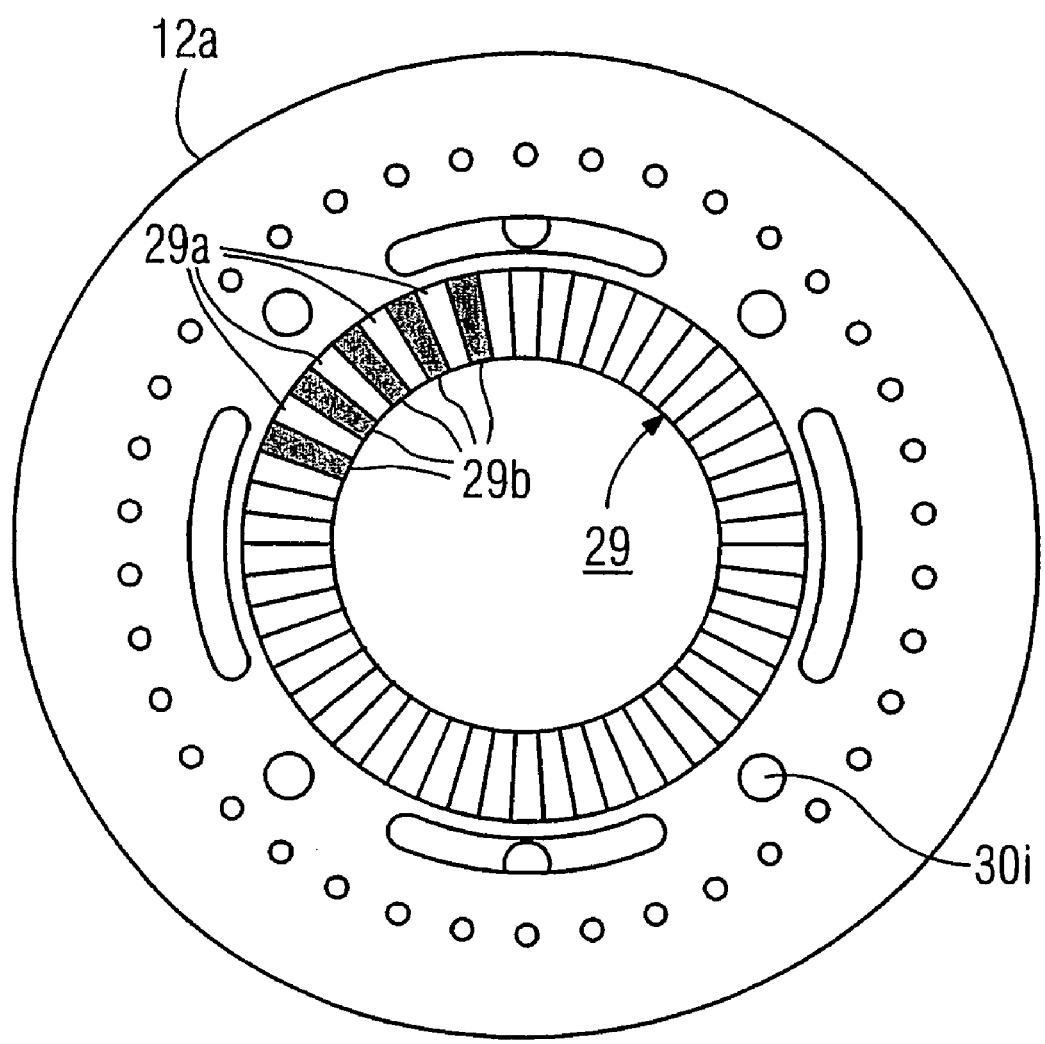
FIG. 8 shows a front view of a flange-like attachment element for the connecting device shown in FIG. 2.

In order to transmit high torques between the flange-like attachment parts 12a and 12b or 22a and 22b on the one hand and the winding former 9 or the drive-end housing part 7a on the other hand, the respective flange-like attachment part is advantageously not just screwed to the winding former 9 or to the housing part 7a. In fact, as is indicated by the illustration of the attachment part 12a chosen for FIG. 8, each attachment part may advantageously have an end tooth system 29, which can be seen in the side view in the figure, with projecting teeth 29a and groove-like intermediate spaces or depressions 29b between them. In this case, the tooth system can advantageously be designed in a manner known per se so as to produce a self-centering connection which can transmit power, and in which case the torque can be passed on over a relatively large radius. The mating surface of the winding former 9 or of the housing part 7a has a corresponding tooth system, with the teeth 29a in the tooth system 29 on the flange-like attachment part 12a engaging in corresponding grooves in the mating surface of the winding former or of the housing part. The figure also shows holes 30i for a screw connection between the attachment part 12a and the winding former 9.

The exemplary embodiments that have been explained above have been based on the assumption that a glass-fiber-reinforced plastic (GFC) is used for the fiber composite bodies 13 and 23. It is, of course, also possible to use plastics reinforced with other fibers, for example with carbon fibers, provided that these materials ensure torque transmission with poor heat transmission at the same time.

Furthermore, a connecting device designed may also have a plurality of concentrically surrounding composite bodies rather than a single hollow-cylindrical fiber composite body, each, if required, also having their own flange-like, concentrically surrounding attachment parts.

Furthermore, the exemplary embodiments illustrated in the figures have been based on the assumption that the mating surfaces against which the respective composite body is pressed by a plurality of compression ring bodies, which may also be formed by just a single component, are formed on the respective attachment part. The respective attachment part may, of course, also be composed of a plurality of bodies for this purpose.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 *USPQ2d* 1865 (Fed. Cir. 2004).

The invention claimed is:

1. A machine having a rotor mounted on a rotor shaft to rotate about a rotation axis, comprising:
    a rotor external housing which is attached to the rotor shaft;
    a winding comprising a winding former and a winding that is to be cooled, the external housing surrounding the winding former and the winding that is to be cooled;
    a device which transmits torque between the winding former and the rotor shaft, the device being provided for at least one end of the winding former, the device comprising:
        a pair of metal flange attachment parts, each having a mating surface; and
        a rotationally symmetrical composite body composed of a plastic reinforced with fiber material, to connect the metal flanges, wherein the composite body comprises side parts and a center part integrally located between the side part, the side parts each having a funnel portion that widens away from the winding former, the center part being formed as a hollow cylinder, at least a portion of the center part extending freely between the attachment parts, wherein
        the side parts each have a corrugated portion with a corrugated shape when seen in the circumferential direction,
        the center part is largely uncorrugated,
        the side parts are connected respectively, in an interlocking and power-transmitting manner, to the metal flange attachment parts, and
        each side part of the composite body is detachably pressed against the mating surface of one attachment part, the mating surfaces of the attachment parts each having a shape that matches that of the respective side part; and
        a compression ring body detachably connected to each attachment part in a power-transmitting manner, each compression ring body having a pressing surface with a shape matching that of a corresponding side part.

2. The machine as claimed in claim 1, wherein the side parts having a uniform corrugated shape when seen in the circumferential direction.

3. The machine as claimed in claim 1, wherein the side parts have a corrugated shape in the form of a sine wave or a circular arc when seen in the circumferential direction.

4. The machine as claimed in claim 1, wherein the funnel portion of each side part has the corrugated shape.

5. The machine as claimed in claim 1, wherein the side parts of the composite body each have an end section in the form of a hollow cylinder.

6. The machine as claimed in claim 5, wherein each end section has a corrugated shape.

7. The machine as claimed in claim 1, wherein
    outer portions of the center part of the composite body are pressed in an interlocking, power-transmitting manner against corresponding attachment parts by a respective compression ring body.

8. The machine as claimed in claim 1, wherein
    the side parts are joined to the center part at respective junctions, and
    at least the majority of fibers in the fiber material extend without interruption over the junctions between the side parts and the center part.

9. The machine as claimed in claim 1, wherein the fiber material of the composite body is formed of glass fibers or carbon fibers.

10. The machine as claimed in claim 1, wherein the flange-like attachment parts are each provided with an end tooth system, which can engage in a corresponding tooth system on the associated part of the winding former or of the side housing part of the rotor external housing which is connected to the rotor shaft part.

11. The machine as claimed in claim 10, wherein the tooth system is designed to be self-centering.

12. The machine as claimed in claim 1, wherein the flange-like attachment parts are made of a steel.

13. The machine as claimed in claim 1, wherein the connection between each compression ring body and the respective attachment part is a screw connection.

14. The machine as claimed in claim 1, wherein the winding to be cooled has conductors containing metallic low-$T_c$ superconductor material or metal-oxide high-$T_c$ superconductor material.

15. The machine as claimed in claim 1, wherein the winding former is surrounded by a vacuum.

16. The machine as claimed in claim 1, wherein the center part of the composite body is completely uncorrugated.

* * * * *